Nov. 10, 1959 J. W. BENFIELD ET AL 2,911,722

DENTAL TRAY

Filed Feb. 27, 1956 4 Sheets-Sheet 1

INVENTORS
JAMES W. BENFIELD
BY CHARLES BLECHNER
Morgan, Finnegan, Durham & Pine
ATTORNEYS.

DENTAL TRAY
Fig. 5
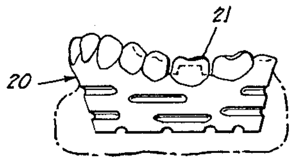
Fig. 6
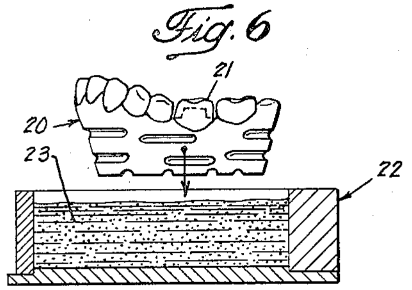
Fig. 7
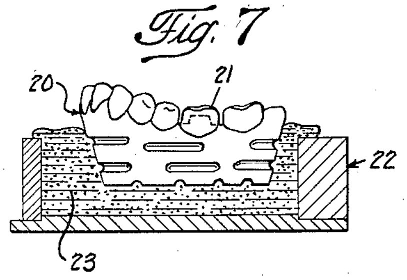
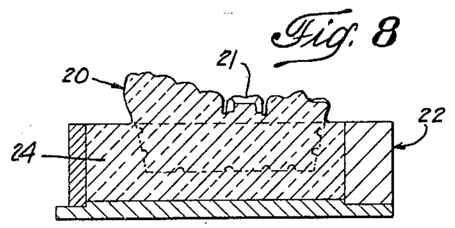
Fig. 9
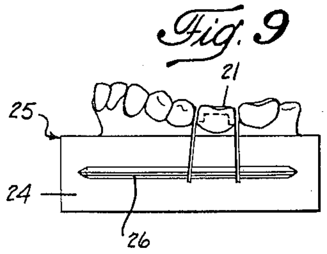
Fig. 10
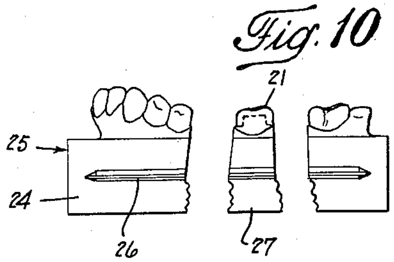
Fig. 11
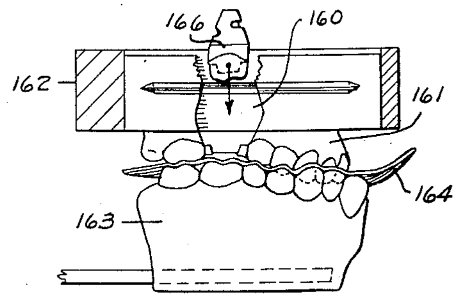
Fig. 12
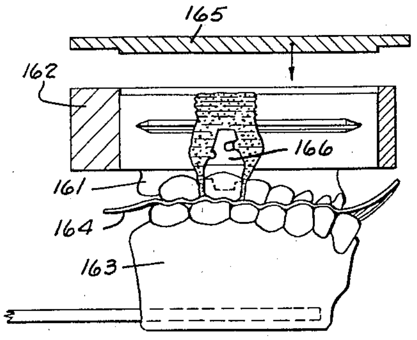
INVENTORS
JAMES W. BENFIELD
BY CHARLES BLECHNER
Morgan, Finnegan, Durham & Pine.
ATTORNEYS.

Nov. 10, 1959 J. W. BENFIELD ET AL 2,911,722

DENTAL TRAY

Filed Feb. 27, 1956 4 Sheets-Sheet 3

INVENTORS
JAMES W. BENFIELD
BY CHARLES BLECHNER
Morgan, Finnegan, Durham & Pine
ATTORNEYS

DENTAL TRAY

Filed Feb. 27, 1956

INVENTORS
JAMES W. BENFIELD
CHARLES BLECHNER
BY Morgan, Finnegan, Durham & Pine
ATTORNEYS.

United States Patent Office 2,911,722

Patented Nov. 10, 1959

2,911,722

DENTAL TRAY

James W. Benfield, Hartsdale, N.Y., and Charles Blechner, Hillside, N.J.

Application February 27, 1956, Serial No. 567,806

20 Claims. (Cl. 32—32)

This invention relates to a novel dental tray to be used in producing dental restorations, such as inlays, crowns, bridges, and the like, by the operative dental method known by those familiar with dental practice as the "hydrocolloid technique." Also, the invention pertains to a novel method of producing models, dies, wax patterns and castings used in making dental restorations.

Various methods have been used by dentists in producing dental restorations. One commonly used technique is the "compound" method, wherein a sealing-wax like compound material is employed to take impressions of individual teeth in the construction of inlays and crowns. In accordance with this method, the compound is softened by heating and put into a short segment of thin-walled copper tubing. This confining band makes it possible to force the softened compound over the tooth which has been prepared for an inlay or crown and to obtain an impression. The material becomes rigid and inflexible when cooled before the band is removed from the tooth. In using this method, great care is necessary to prevent the creation of undercut areas in the preparation of the tooth because the rigid compound cannot be withdrawn from such areas without distortion or fracture. It is also necessary, for the same reason, to prevent the impression band from being seated too far on the tooth and thus allowing the impression material to reach undercut areas on the outside walls of the tooth. This is often difficult because human teeth are essentially undercut objects. They are almost always greater in diameter at or near the biting surface than they are at the gum line. For this reason, impressions taken with compound are often broken or distorted, necessitating repeating the impression or remaking the casting when it is later discovered that distortion has occurred. These facts made it evident that there was an important place in dentistry for an elastic impression material which could be withdrawn from undercut areas yet which would immediately return to its original form.

As indicated above, the desirability of using an elastic impression material led to what is known by the dental profession as the "hydrocolloid technique." The hydrocolloid technique has not yet been widely adopted. The reasons for this will be explained in detail hereinbelow, but in general it is due to the heretofore delicate procedures and time-consuming efforts required in properly carrying out this method. If properly carried out, the hydrocolloid method possesses many advantages over the more commonly used methods, for it makes possible the production of dental restorations possessing accuracy of fit not obtainable by the more commonly used methods.

For clarity, the following are given as definitions of the terms used herein:

The term "impression" shall include any negative taken of a patient's tooth or teeth using a suitable impression material.

The term "hydrocolloid" shall include any natural or synthetic elastic impression material useful in making dental impressions, such as hydrocolloids derived from kelp, synthetic rubber elastomers, alginates, etc.

The term "model" shall include any model poured from an impression using a suitable model-forming substance.

The term "stone" shall include any material useful in forming models from impressions such as die stone, hydrocals, and plaster of Paris.

The term "die" shall include any portion of a model cut therefrom and representing a prepared tooth.

The term "wax pattern" shall include any pattern formed from a die using wax or a wax-like substance.

The term "investment mold" shall include any mold made from a wax pattern by surrounding the wax pattern with a suitable refractory investment material and burning out the wax pattern.

The term "casting" shall include any casting, such as an inlay, crown, or other restorative work formed from an investment mold, using a suitable substance, such as gold or the like.

As indicated heretofore, the compound method for producing dental restorations includes taking impression of individual teeth. In the hydrocolloid method, however, usually impressions of several teeth are taken. In general, an impression is taken of at least one adjacent tooth on each side of the prepared tooth or teeth, and usually an entire quadrant of the patent's jaw or the whole lower or upper arch in one impression. Of course, in some instances, there will be no teeth adjacent to the prepared tooth, as for example in the case of a third molar or where adjacent teeth have already been extracted.

In general, the hydrocolloid method comprises the following operations: The dentist, after preparing the tooth or teeth requiring dental restorations, takes negative impressions of the prepared tooth and adjacent teeth, and an impression of the opposing teeth, using a hydrocolloid material in forming the impressions. In forming an impression, the hydrocolloid material is heated to liquefy it and after it has been tempered sufficiently to bring it to a semi-solid consistency, some of the material is injected into the prepared tooth or teeth and additional material is carried to place by means of water-cooled tray to cover the injected prepared tooth or teeth and the adjacent teeth.

From the impression a model of the teeth is made, utilizing a dimensionally accurate and stable powder, such as die stone, which when mixed with water may be flown into a hydrocolloid impression without distorting it. This material is mixed with water to a putty-like consistency and then flown into the hydrocolloid impression with the aid of vibration. Preferably, the material injected into the impression is allowed to set 24 hours before being used as a model. The model is then cut to obtain a die or dies representing the prepared tooth or teeth. Each die is then used in forming a wax pattern. From the wax pattern an investment mold is formed. From this mold the ultimate casting, such as an inlay, crown or the like, is formed, using a suitable material such as gold or the like.

Heretofore, a number of different modifications for forming a model, including a die or dies, from a hydrocolloid impression, have been used, but none has been completely satisfactory. Some of these modifications invite inaccuracies to be created in the model, and in particular the die or dies of the model, formed by such procedure. Other known hydrocolloid techniques necessitate duplicate impressions which involve a loss of valuable time on the part of the dentist, dental technician, and the patient. In order to show the disadvantages and defects of the heretofore known methods employing a hydrocolloid material, a short description of those most commonly used will be described hereinbelow:

In accordance with one prior technique, the area of the impression representing a prepared tooth only is poured with die stone. Into this stone is placed a serrated end of a tapered metal dowel pin with one side of the dowel pin being flattened to provide key means for positioning in the model. This portion of the stone is allowed to set and is then lubricated with a separating medium before the remainder of the model is poured. The separable portion or die containing the prepared tooth can then be removed from the model and repositioned by means of the keyed dowel pin. This method is the most widely used at the present time but it leads to inaccuracies and difficulties. Distoration and dimensional changes occur in the impression material the longer it remains incompletely poured. The weight of the stone and dowel in the impression area of the prepared tooth can conceivably distort the sometimes fragile walls of the impression. It should be obvious that pouring the entire model at one time would be preferable from the standpoint of accuracy. It takes 20 minutes for the stone to reach its initial set. In the meantime, the dowel may sink too far into the soft die stone or it may change its position slightly. The former might lead to inaccuracy of the die and the latter development may make it difficult or impossible to separate the die from the impression. Even though no difficulty is encountered in removing the die, the dowel, while providing a positive seat for the die when it is repositioned, does not prevent movement of the die in a vertical direction. This makes it difficult to produce a casting which possesses extreme accuracy of fit with respect to the adjacent and opposing teeth.

A second known modification involves the pouring of the impression in the area of the prepared tooth only and piling enough stone onto this area to create a tail or handle for the die. This is allowed to set and then this stone is withdrawn from the impression to be used as the master die. The impression is now poured completely. The result is that you obtain a die of the prepared tooth and a model of the entire arch or quadrant. The objections to this method are that it is possible for distortion to occur when only one area is poured, especially when enough material is added to make a handle for the die. Also, the removal of the set stone of the first pouring is almost certain to tear the delicate impression. Moreover, distortion and dimensional changes occur in the impression material the longer it remains incompletely poured no matter how or where the impression is stored.

By another known technique, thin stainless steel strips are inserted into the impression on either side of the prepared tooth. These strips act as a means of partial separation of the die of the individual tooth from the rest of the model. The die is created by cutting the model with a fine saw to the upper level of the strips, then removing the strips, and finally breaking away the base of the die to separate it from the rest of the model. The component pieces of the model, including the die, can then be reassembled but there is objection to the insertion of anything even including the very thin stainless strips into the impression material once it has been removed from the patient's mouth. These strips must of necessity be located very close to the area of the prepared tooth, and their insertion is likely to cause some distortion. Another disadvantage of the aforementioned technique is that it is difficult to parallel these flexible strips in order to permit withdrawal of the die from the model.

Taking duplicate impressions and pouring both of them completely eliminates almost all objections because an individual die can be cut from one model and the other model remains intact for trial of the wax pattern and finished casting. However, there is a loss of time involved here as well as additional material cost. This would militate against the adoption of the technique by many men in the profession who would find it too time-consuming.

Objects and advantages of the invention will be set forth in part hereinafter and in part will be obvious herefrom, or may be learned by practice with the invention, the same being realized and attained by means of the steps, combinations and improvements pointed out in the appended claims.

The invention consists in the novel steps, combinations and improvements herein shown and described.

Accordingly, it is an object of this invention to provide a novel dental method and dental article whereby a model, including a removable die or dies representing a prepared tooth or teeth for use in the production of dental restorations, such as crowns, inlays and the like, may be produced from a hydrocolloid impression without distorting the impression and before any significant dimensional changes occur in the impression. Another object of this invention is to provide a novel dental method and dental article for the production of a model of a number of teeth including removable die or dies representing a prepared tooth or teeth whereby said die may be readily removed from the model and reassembled therein without difficulty and with no accompanying damage to said model. Yet another object of this invention is to provide a novel dental method and dental article for producing a model of teeth including a removable die or dies representing a prepared tooth or teeth whereby said die or dies and the remaining portions of the model when assembled are held in a tight abutting relation at their base to prevent relative horizontal movement with respect thereto. A still further object of this invention is to provide a novel dental method and dental article for producing a model of teeth including a removable die or dies representing a prepared tooth or teeth whereby said model when assembled is capable of being articulated with a model of opposing teeth and has no vertical movement with respect thereto. A still further object of this invention is to provide a novel dental method and dental article whereby a model of teeth including a removable die or dies of a prepared tooth or teeth may be produced quickly and efficiently and whereby wax patterns, investment molds, and castings of high exactness may be produced from said model in a quick, simple and inexpensive manner. Another object of this invention is to provide a novel dental method and dental apparatus whereby multiple wax patterns and multiple castings may be produced accurately and efficiently.

The accompanying drawings, referred to herein and constituting a part hereof, illustrate embodiments of the invention, and together with the description, serve to explain the principles of the invention.

In the drawings:

Fig. 5 is a side elevation of a trimmed down model to be used with the novel tray of this invention, the original shape of said model being indicated by dot and dash lines;

Fig. 6 is a side elevation partly in section of the trimmed down model of Fig. 5 just before insertion into a tray filled with stone;

Fig. 7 is a side elevation partly in section of the model of Fig. 5 in its final position in the tray;

Fig. 8 is a longitudinal vertical section of the model and its new precision base;

Fig. 9 is a side elevation of the model of Fig. 8 removed from the tray and sawed part way through each side of the prepared tooth;

Fig. 10 is a side elevation similar to Fig. 9 but showing the model broken in three pieces to separate out the die portion representing the prepared tooth;

Figs. 11 and 12 are sectional views of the tray of Figs. 1–4 with the base of the tray being removed to permit the passage of a new die and stone into a cut-out portion of a model requiring a repair job;

Figure 1:
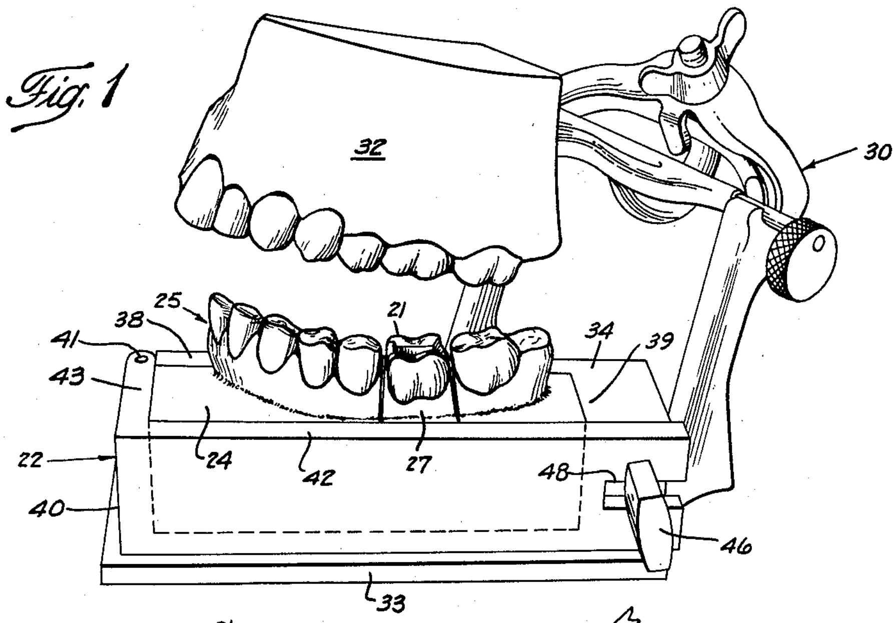
Fig. 1 is a perspective view of one embodiment of the novel tray of this invention mounted on an articulator with an upper model being held by the articulator and an opposing lower model by said tray.

It has been found that the object of this invention may be realized by the utilization of a novel dental tray. More particularly, the novel tray of this invention serves two purposes. First, it permits the fabrication therein of a model having a precision base from a conventional hydrocolloid model and a subsequent removal of said model with precision base from said tray for the purpose of cutting a die or a plurality of dies therefrom. Secondly, the novel tray serves to hold the model in the course of forming a wax pattern from a die of said model. The novel tray is of such construction that a die may be removed from the model held in the tray and worked on individually and later reassembled in the tray with the remaining portions of the model with precision accuracy to establish its relationship with adjacent and opposing teeth. More specifically, the novel tray of this invention is provided with gate means whereby a die may be removed from a model held in the tray by manual displacement in a horizontal direction. Moreover, the tray is provided with gate locking or clamping means so that when the die is reassembled in the model, the separate base portions of the model are held tight against relative horizontal movement so that an accurate relationship is obtained with respect to adjacent teeth. Moreover, the tray is provided with means for preventing vertical displacement of the model from the tray so that a precise relationship is obtained with respect to the opposing teeth.

As indicated hereinabove, the novel tray of this invention is used in conjunction with a model having a precision base. Attention is now directed to Figs. 5–10 of the drawing illustrating the production of a model with a precision base. It should be realized that the quadrant model shown in Figs. 5–10 is only for the purpose of illustration and that any other model such as an anterior quadrant or a full arch model may be used with a correspondingly shaped tray. In Fig. 5 there is shown a conventional hydrocolloid quadrant model 20 formed in a conventional manner (not shown). This model 20 is formed by taking an impression of a quadrant of the teeth including an impression of the prepared tooth. At the same time, an impression is also taken of the opposing teeth. From these impressions models are formed using a suitable material such as die stone by pouring said material in said impressions. Advantageously, the impression is poured in its entirety as soon as it is taken. This precludes dimensional change of the material and also saves time. The model 20 is then generally trimmed to give the appearance shown in full lines in Fig. 5.

Model 20, including portion 21 representing a prepared tooth, is then provided with a precision base by inserting it in a tray 22 filled with a soft mix of stone 23 in the manner shown in Figs. 6 and 7. The internal surfaces of the tray are lubricated so that the resulting model may be readily removed from the tray after the stone has become hardened on setting. On setting the model 20 is provided with a new base portion 24, the new model being designated 25 as shown in Figs. 8–10 of the drawing.

As mentioned hereinbefore, means are provided in the tray to prevent vertical displacement of the model from the tray. Accordingly, in forming the model with precision base the tray 22 is provided with horizontal serrations (not shown) on the side walls so that the die stone forming the precision base fills the serrations so as to provide on setting tongues 26 on the sides of the precision base. Accordingly, the tongues on the base and complementary grooves on the tray prevent upward movement of the model from the tray.

Tray 22 is provided with a movable gate (not shown) whereby model 25 may be removed therefrom by manual displacement in a horizontal direction. As shown in Figs. 9 and 10, the portion 21 of the model representing the prepared tooth is then separated from the portions representing the rest of the teeth of the model. Of course, it should be realized that more than one portion of a model representing a prepared tooth may be present. The number of portions or dies cut from the model will of course depend upon the number of required wax patterns and castings. As shown in Figs. 9 and 10, a die 27 (Fig. 10) is formed by cutting the model 25 vertically on each side of portion 21 at least about halfway the depth of the base, as for example, two thirds the depth as shown in Fig. 9. The model is then broken the remaining portion of the depth as shown in Fig. 10. By cutting and breaking the base in this manner, it is possible to provide a die or a plurality of dies wherein each die can be removed from the model and worked on individually in the course of forming the wax pattern from the die and then reassembled in the tray with the remaining portions of the model with precision to establish the relationship with adjacent and opposing teeth.

Moreover, the tray 22 is not only used in forming the model with a precision base in the manner described hereinabove and illustrated in Figs. 5–10 but also it is a most important implement in the course of forming the wax pattern from the die. Accordingly, attention is directed to Figs. 1–4 of the drawings which illustrate one embodiment of a tray of this invention used in conjunction with the model 25 including die 27 of Fig. 10. As shown in Figs. 1–4, the tray 22 containing the model 25 including the die 27 is mounted on the lower platform or bow 31 of an articulator 30. Mounted on the upper platform of an articulator 30 is opposing model 32. Tray 22 comprises a base 33, a stationary L-shaped member 34, removably secured on said base 33 by means of screws 35, 36 and 37, said L-shaped member 34 forming side wall 38 and end wall 39; and a second L-shaped member 40 movable in a horizontal direction by being hingedly mounted to stationary L-shaped member 34 at 41 and forming side wall 42 and end wall 43. The base member 33 is shouldered at 44 and 45 so that side walls 38 and 42 rest against said shoulders.

Figures 2, 3, 4:
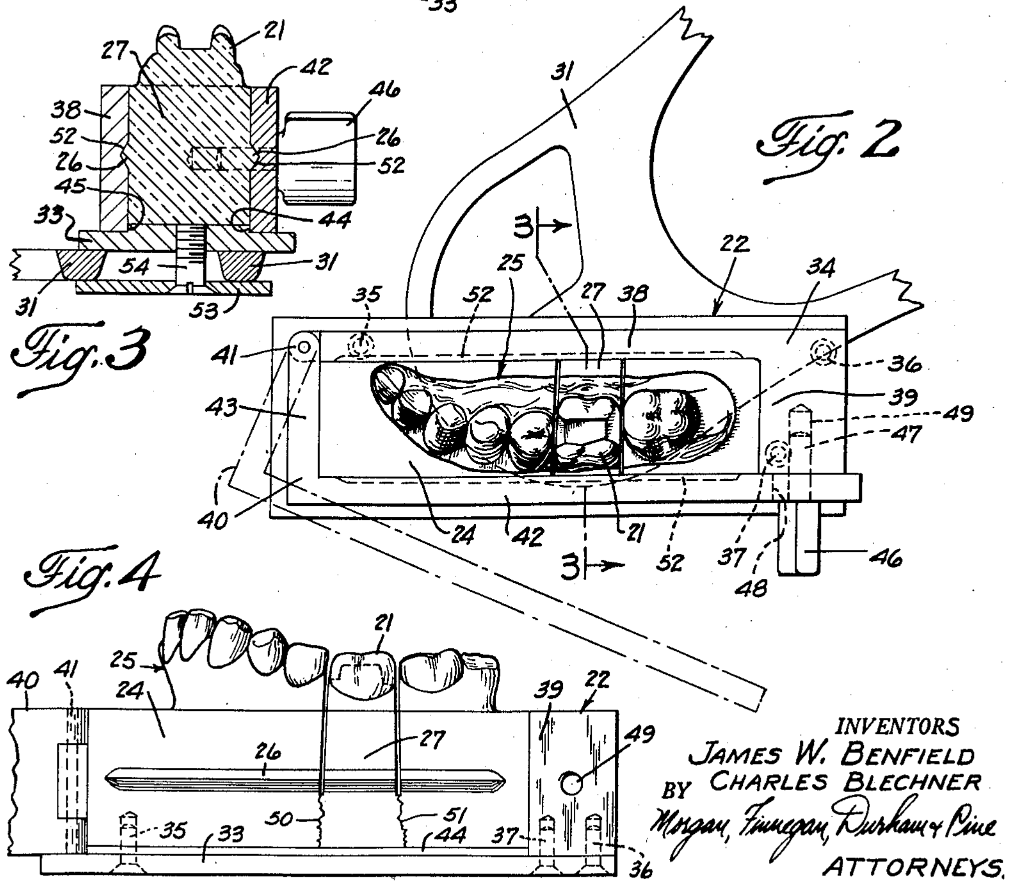
Fig. 2 is a plan view of the tray of Fig. 1 mounted on the lower platform of an articulator.
Fig. 3 is a sectional view on the line 3—3 of Fig. 2.
Fig. 4 is a side elevation of the tray of Fig. 1 with the gate open and broken off to show the model held in said tray.

As shown in Fig. 2 by dot and dash lines, movable L-shaped member 40 may be swung outwardly to provide gate means for the model held in the tray. Such gate means are essential to permit the removal of the model from the tray after the formation of the precision base as shown in Fig. 8 so that a die or dies may be cut therefrom as shown in Figs. 9 and 10. Then too, gate means are required for the removal of a die from the model so that it may be worked on individually and later reassembled with the adjacent portions of the model.

As indicated hereinbefore, in order that the die and wax pattern thereon maintain a precise relationship with respect to the portions of the model representing adjacent teeth, it is essential that there be no relative horizontal movement of the reassembled portions of the model. Accordingly, after the die 27 has been reassembled with the remaining portions of the model as shown in Fig. 4, the movable L-shaped member 40 shown in dot and dash lines in Fig. 2 is swung to the closed position, shown in full lines in Fig. 2 and in Fig. 1. Next, movable L-shaped member 40 is tightly clamped to stationary L-shaped member 34 by means of thumb screw 46. Thumb screw 46 has a threaded shank 47 which passes through slot 48 in side wall 42 and into the threaded opening 49 in end wall 39. By providing clamping means of the aforementioned type, a pressure is exerted by the tray on the reassembled portions of the model, thus preventing relative horizontal movement. As mentioned earlier, the base portions of the model are broken so that when reassembled a tight fit is effectuated as shown at 50 and 51 of Fig. 4.

Side walls 38 and 42 are provided with horizontal grooves or serrations 52 so that in the formation of the precision base the sides thereof are provided with tongues 26 in a manner described hereinbefore in detail when discussing Figs. 5–10. By providing grooves 52 in the tray 22 and tongues 26 on the precision base of model 25, there is prevented vertical displacement of the model from the tray 22 resulting in a precise relationship between the model 25 and the opposing model 32 representing the opposing teeth.

As is best shown in Fig. 3, base 33 of the tray is removably attached to the lower platform 31 of the articulator 30 by means of washer or strap 53 and screw 54. By this construction, the tray and model may be positioned on the platform where required in obtaining the proper relationship with respect to the opposing model.

Figures 13, 14, 15, 16, 17, 18:
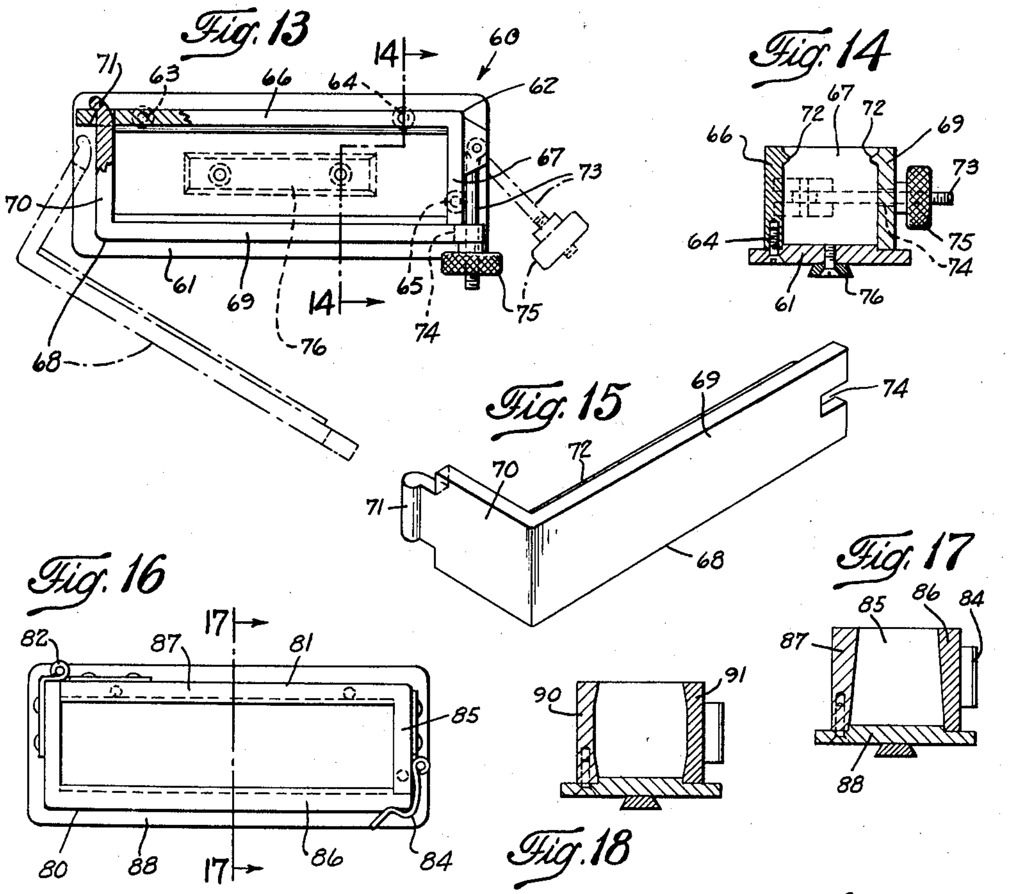
Fig. 13 is a plan view of a different embodiment of tray from that shown in Figs. 1–4, said second tray having different hinge means for the gate, different gate locking means and different model retaining means.
Fig. 14 is a sectional view on line 14—14 of Fig. 13.
Fig. 15 is a perspective view of the gate or movable member of the tray of Fig. 13.
Fig. 16 is a plan view of another embodiment of tray employing different hinge means, gate locking means and model retaining means from those used in the embodiments of Figs. 1–4 and Figs. 13–15.
Fig. 17 is a sectional view on line 17—17 of Fig. 16 showing the side walls of the tray to be tapered in one direction.
Fig. 18 is a sectional view of a tray similar to those of Fig. 17 except the side walls are double tapered.

A second embodiment of the novel tray of this invention is shown in Figs. 13–15. The tray 60 comprises a base 61, a stationary L-shaped member 62, removably mounted on base 61 by means of screws 63, 64 and 65, said L-shaped member 62 forming side wall 66 and end wall 67; and a second L-shaped member 68 forming side wall 69 and end wall 70, pivotally connected to stationary L-shaped member 62 by means of tenon 71 on end wall 70, inserted in a complementary slot in side wall 66. As shown in Fig. 13 by dot and dash lines, movable L-shaped member 68 may be swung outwardly to provide gate means for a model held in the tray.

In the embodiment of Figs. 13–15, the means for preventing vertical displacement of a model from the tray are provided by means of ribs 72, which form complementary grooves in the sides of the precision base of a model formed in accordance with the procedure described hereinbefore in detail. The clamping means for locking movable L-shaped member 68 to stationary L-shaped member 62 comprises a threaded stud 73 swingably mounted on end wall 67 and adapted to pass through slot 74 in side wall 69, whereby the two L-shaped members may be clamped together by the movement of internally threaded thumb nut 75 rotatably mounted on stud 73. As shown in Fig. 14, base 61 is provided with an underlying dovetail member 76, whereby the tray may be temporarily attached to a platform of an articulator (not shown) by inserting the dovetail through a slot in the platform and surrounding it with a suitable temporary cementing agent such as plaster of Paris.

A still further embodiment of the tray is shown in Figs. 16–17. In this modification, movable L-shaped member 80 is hinged connected to stationary L-shaped member 81 by hinge 82. The two L-shaped members may be clamped together by means of a spring snap 84 pivotally mounted at one end on end wall 85 of L-shaped member 81 and urged at its other end against side wall 86 of L-shaped member 80. As best shown in Fig. 17, side walls 86 and 87 are flared outwardly to provide means for preventing vertical displacement of a model from the tray. The base 88 of the tray is provided with a dovetail arrangement identical to the dovetail 76 of the embodiment shown in Figs. 13–15.

In Fig. 18 there is illustrated an embodiment of a tray identical to that of Figs. 16–17, except the side walls 90 and 91 are double flared to provide means for preventing removal of a model in the tray in both upward and downward directions.

Figure 19:
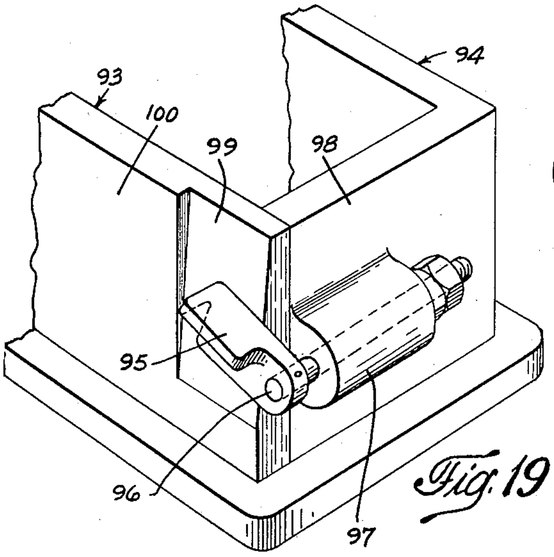
Fig. 19 is a perspective view of another embodiment of a tray showing another form of gate locking means.

Another modification is shown in Fig. 19 of clamping means for locking movable L-shaped member 93 to stationary L-shaped member 94. In this modification there is provided a thumb latch 95 pivotally mounted on pin 96 held in bracket 97 integral with the side wall 98 of stationary L-shaped member 94. In its position as shown in Fig. 19, the thumb latch wedges on a tapered surface 99 cut out of the side wall 100 of movable L-shaped member 93 to clamp together the two L-shaped members 93 and 94.

Figure 20:
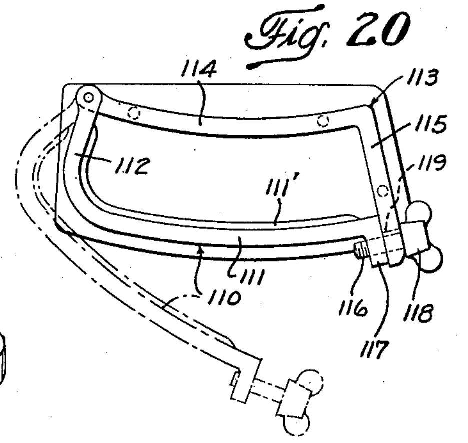
Fig. 20 is a plan view of a still further embodiment showing a curved tray.

A still different modification is illustrated in Fig. 20. In this embodiment a movable curved member 110 forming side wall 111 and end wall 112 is pivotally mounted to stationary curved member 113 forming side wall 114 and end wall 115. In this arrangement the clamping means is mounted on the side wall 111 of the movable member 110. This clamping means comprises a thumb screw 116 having wing portion 118 and threaded into bracket 117 integral with side wall 111. Thumb screw 116 passes through a slot 119 formed in end wall 115. In locking the movable member to the stationary member from its open position shown in dot and dash lines to its closed position shown in full line in Fig. 20, the thumb screw is inserted in slot 119 in end wall 115, after which the thumb screw is manipulated so that its wing portion 118 presses against the outer surface of end wall 115 to effectuate the desired locking effect. Side wall 111′ is provided with a longitudinal rib 111 to prevent vertical displacement of the model from the tray in the manner described in detail hereinbefore.

Figure 21:
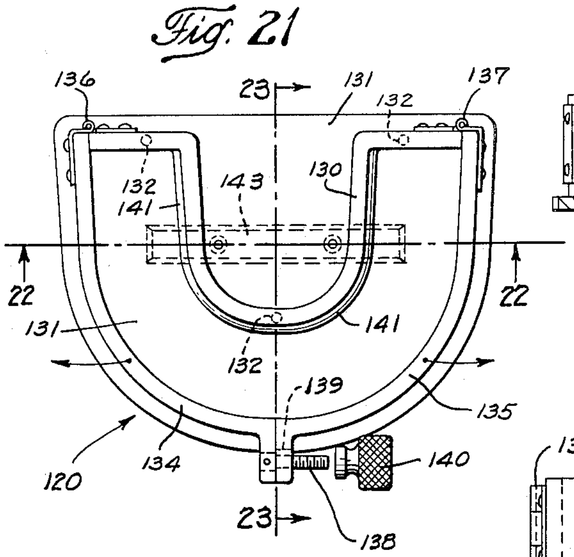
Fig. 21 is a plan view of another embodiment of a tray adapted to be used in conjunction with a full arch model in contrast to the previous embodiments which are useful with a quadrant model.
Figure 22:
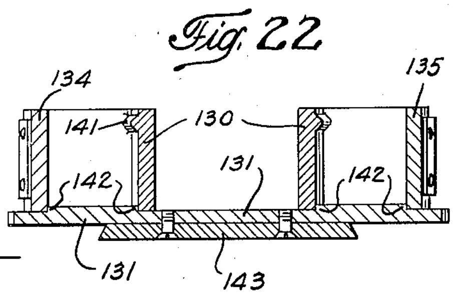
Fig. 22 is a sectional view along the line 22—22 of Fig. 21.
Figure 23:
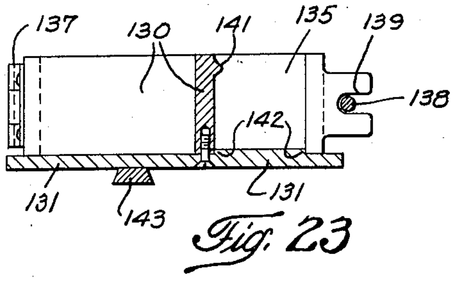
Fig. 23 is a sectional view along the line 22—23 of Fig. 21.

The embodiments described hereinabove are trays adapted to be used with models of the right quadrant. As indicated heretofore, however, the principles of the present invention are applicable to trays to be used with models of any portion of the jaw. Accordingly, as will be well understood by those skilled in the field, left quadrant tray would be identical to right quadrant trays except that the gate means would be on the opposite side or sides from that shown in the aforedescribed right quadrant trays. Attention is invited to the embodiment shown in Figs. 21–23, illustrating a tray adapted to be used in conjunction with a full arch model. Full arch tray 120 compresses a generally U-shaped stationary rear wall 130 removably secured to base 131 by means of screws 132. Left and right hand pivoted walls 134 and 135 are hinged to the ends of the rear wall 130 at 136 and 137. The hinged walls when in their closed position shown in Fig. 21 enclose an area approximating the shape of a full arch model. The hinged walls 134 and 135 may be clamped together by means of a threaded stud 138 carried by the outer end of wall 134 and projecting through a slot 139 in the outer end of wall 135. An internally threaded thumb nut 140 is carried by said stud which on manipulation causes the outer ends of the hinged walls to be clamped together. The inner wall 130 is provided with a projecting rib 141 to prevent vertical displacement of a model from the tray in a manner described hereinbefore in detail. Also, the base 131 is shouldered at 142 to provide a rest or stop for the hinged plates in their position shown in Fig. 21. The base plate 131 is also provided with an underlying dovetail 143 so that the tray may be secured to an articulator platform by means of a suitable temporary cementing agent.

As indicated hereinabove, the tray of Figs. 21–23 is adapted to support a full arch model. An anterior quadrant tray would be produced if the tray of Fig. 21 ended at the line 22—22. Of course, the tray would have hinge construction at the ends of the rear wall for permitting pivoting of the movable walls on the rear wall.

Figure 24:
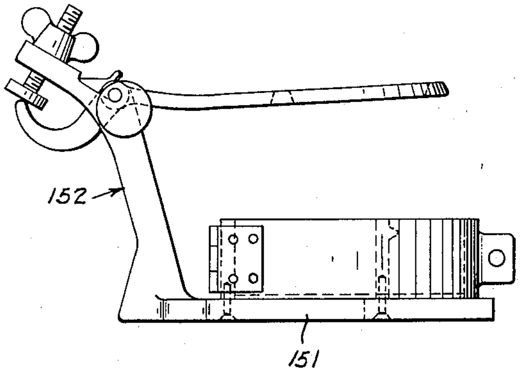
Fig. 24 is a side elevational view of a full arch tray similar to that of Figs. 21–23 but wherein the tray is an integral part of an articulator and in which a partition member is provided so that only a portion of the tray may be used if desired.
Figure 25:
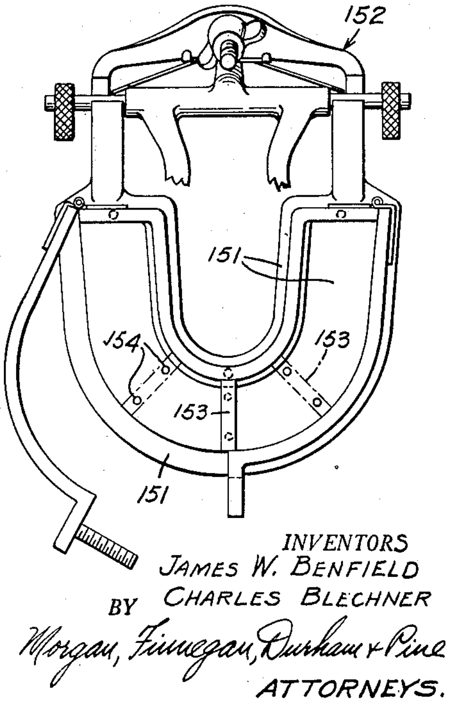
Fig. 25 is a plan view partly broken away of the tray of Fig. 24.
Figure 26:
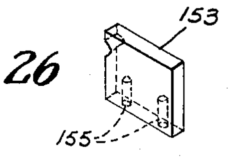
Fig. 26 is a perspective view of a partition to be used in spacing portions of the tray as shown in Fig. 25.

In the construction illustrated in Figs. 24 and 25, the full arch tray is identical to that disclosed in Figs. 21–23 except that the base 151 forms the lower platform of an articulator 152. Also, the base is provided with means for receiving a partition 153 for dividing the enclosed area of the tray in the event the model to be held by the tray is a smaller portion than a full arch. Accordingly, the base of the tray is provided with sets of spaced apertures 154 adapted to receive pins. Openings 155 are provided in the partition 153 for receiving the pins to hold the partition in the desired position on the tray. As shown in Fig. 25, the partition divides the enclosed area into equal halves. As shown by the dotted lines, however, the partition could be positioned to the right or left of the position shown in full lines in obtaining the desired spacing.

It sometimes happens that one die of a model is defective, while the remainder of the model is perfect. The defects in the die may be due to a defective impression or by trapped air bubbles formed in pouring the die from the impression or damage to the die in the course of forming a wax pattern from the die. Accordingly, it may be desirable to do a repair job to replace the defective die with a new die. This is particularly true wherein the model is a full arch model or wherein the model includes a number of dies and only one die has been damaged. Reference is now made to Figs. 11 and 12 illustrating the aforementioned repair procedure. For the purpose of simplicity, a quadrant model and tray is shown.

In carrying out this operation, the defective die is removed and portions of the adjacent parts of the model are removed to leave a space indicated by 160 in Fig. 11. Next, the model 161 and tray 162 are inverted and the model is held in its proper relationship with respect to its opposing model 163 by means of wax bite 164. The base 165 of the tray 162 is removed and a new die 166 made from an impression is inserted into space 160 as shown in Fig. 11 and projected therethrough to assume its proper position as shown in Fig. 12. Next, die stone is added to surround the die as shown in Fig. 12, after which the base of the tray is secured to a side wall and end wall of the tray. On standing, a model is formed and the portion thereof represented by the new die and new precision base portion is cut from the model in the manner illustrated in Figs. 9–10 and a wax pattern is formed in the manner described hereinbefore in detail in describing the tray and model of Figs. 1–4.

The invention in its broader aspects is not limited to the specific mechanisms shown and described, but departures may be made therefrom within the scope of the accompanying claims without departing from the principles of the invention and without sacrificing its chief advantages.

What is claimed is:

1. A dental tray for use in the production of dental restorations, to be used in conjunction with a model of at least a portion of the jaw, said model including at least one die representing at least one prepared tooth, said die being an initially integral but cut portion of said model and having a cut surface in matching relationship to an opposing cut surface of an adjacent portion of said model, said tray comprising a base member, upright wall means mounted on the base member and forming therewith an enclosure defining an open top chamber, said wall means comprising a normally stationary section and at least one normally movable section, the latter being movable relative to said normally stationary section, between a normally closed position relative to said normally stationary section and an open position relative thereto, for enabling introduction to and removal of said model from said chamber in said open position, means for releasably locking said movable section against movement in the closed position, and means on said tray for coacting with said model in the closed position of said normally movable section to prevent vertical displacement of said model, including any die cut therefrom in said chamber, said base member and said stationary wall section having each a surface configuration within the confines of said open-top chamber enabling longitudinal movement of said die toward and away from an adjacent portion of said model in the open position of said normally movable section whereby said cut surface of said die and said adjacent portion may be brought into matching relationship in said chamber.

2. A dental tray in accordance with claim 1, wherein the base member is removably secured to said stationary section.

3. A dental tray in accordance with claim 1, wherein the base member is a platform of an articulator.

4. A dental tray in accordance with claim 1, wherein said movable wall section is pivotally mounted on said stationary wall section.

5. A dental tray in accordance with claim 1, wherein means are provided for clamping said wall sections to each other to prevent relative horizontal movement of component pieces of a model held in said tray.

6. A dental tray in accordance with claim 1, wherein said means for prevening vertical displacement of a model held in said tray is a part of said wall means.

7. A dental tray in accordance with claim 1, wherein said wall means is of a configuration to provide a rectangular enclosure when said movable wall section is in a closed position.

8. A dental tray in accordance with claim 1, wherein said wall means is of a configuration to provide a U-shaped enclosure when said movable wall section is in a closed position.

9. A dental tray in accordance with claim 1, wherein said wall means is provided with a horizontal rib.

10. A dental tray in accordance with claim 1, wherein said wall means is provided with a horizontal groove.

11. A dental tray in accordance with claim 1, wherein the base member is provided with means whereby the tray may be temporarily attached to a platform of an articulator.

12. A dental tray in accordance with claim 1, wherein said wall means has an inclined wall providing a tapered chamber.

13. A dental tray in accordance with claim 1, wherein said stationary wall section comprises an L-shaped member and the movable wall section comprises an L-shaped member.

14. A dental tray in accordance with claim 13, wherein the L-shaped members are pivotally connected to each other.

15. A dental tray in accordance with claim 13, wherein means are provided for clamping said L-shaped members to each other.

16. A dental tray in accordance with claim 15, wherein the clamping means is carried by the stationary wall section.

17. A dental tray in accordance with claim 15, wherein the clamping means is carried by the movable wall section.

18. A dental tray in accordance with 1, wherein said wall means comprises a U-shaped stationary section and a pair of movable wall sections pivotally mounted at opposite ends of said U-shaped section.

19. A dental tray in accordance with claim 18, wherein clamping means are provided for clamping together said movable wall sections.

20. A dental tray in accordance with claim 18, wherein said U-shaped stationary section is provided with a horizontal rib.

References Cited in the file of this patent

UNITED STATES PATENTS

| | | |
|---|---|---|
| 1,030,638 | Binning | June 25, 1912 |
| 1,445,499 | Douglass | Feb. 13, 1923 |
| 1,482,149 | Remy | Jan. 29, 1924 |
| 2,006,132 | Fleming et al. | June 25, 1935 |
| 2,036,735 | Welker | Apr. 7, 1936 |
| 2,700,219 | Lindley | Jan. 25, 1955 |